US012056723B1

(12) United States Patent
Bin et al.

(10) Patent No.: US 12,056,723 B1
(45) Date of Patent: Aug. 6, 2024

(54) SYSTEM, METHOD, AND COMPUTER PROGRAM FOR EXTRACTING LARGE CUSTOMER DATA VOLUMES AT HIGH SPEED FROM AN EXTERNAL MULTI-TENANT SAAS ENVIRONMENT

(71) Applicant: Odaseva Technologies SAS, Neuilly-sur-seine (FR)

(72) Inventors: Sovane Bin, San Francisco, CA (US); Saddek Dekoum, Ris Orangis (FR); Raphaël Fonrouge, Chatenay Malabry (FR); Francois Lopitaux, San Carlos, CA (US); Constance Bin, Martel (FR)

(73) Assignee: Odaseva Technologies SAS, Neuilly-sur-seine (FR)

( * ) Notice: Subject to any disclaimer, the term of this patent is extended or adjusted under 35 U.S.C. 154(b) by 295 days.

(21) Appl. No.: 17/496,543

(22) Filed: Oct. 7, 2021

(51) Int. Cl.
  *G06Q 30/02* (2023.01)
  *G06Q 30/0201* (2023.01)
(52) U.S. Cl.
  CPC .............................. *G06Q 30/0201* (2013.01)
(58) Field of Classification Search
  CPC .......................................... G06Q 10/00–90/00
  See application file for complete search history.

(56) References Cited

U.S. PATENT DOCUMENTS

| | | |
|---|---|---|
| 6,642,946 B1 | 11/2003 | Janes et al. |
| 8,255,320 B1 | 8/2012 | Seal et al. |
| 9,268,587 B2 | 2/2016 | Kruglick |
| 9,769,131 B1 | 9/2017 | Hartley et al. |
| 11,055,123 B1 | 7/2021 | Bin et al. |
| 11,609,774 B2 | 3/2023 | Bin et al. |
| 2008/0049942 A1 | 2/2008 | Sprunk et al. |
| 2012/0117558 A1 | 5/2012 | Futty et al. |
| 2012/0324242 A1 | 12/2012 | Kirsch |
| 2013/0283060 A1 | 10/2013 | Kulkarni et al. |
| 2013/0297769 A1 | 11/2013 | Chang et al. |
| 2014/0040182 A1* | 2/2014 | Gilder .................. G06F 16/256 707/602 |
| 2014/0101438 A1 | 4/2014 | Elovici et al. |
| 2014/0143661 A1 | 5/2014 | Carreno-Fuentes et al. |

(Continued)

FOREIGN PATENT DOCUMENTS

WO  2022081408  4/2022

*Primary Examiner* — Arif Ullah
(74) *Attorney, Agent, or Firm* — Lessani Law Group, PC (57) ABSTRACT

The present disclosure relates to a system, method, and computer program for extracting large customer data volumes at high speed from an external multi-tenant SaaS environment. The system identifies a plurality of customer data objects to be extracted from the multi-tenant SaaS environment. The system creates an extraction plan for extracting the identified data objects, which includes identifying characteristics of each data object to be extracted, creating a plurality of extraction groups, determining an extraction frequency and extraction mode, determining a scope of data extraction, assigning an API to each extraction group, identifying extraction parameters, determining a degree of parallelism, and creating an extraction plan. The system displays the extraction plan in a user interface and enables a user to edit the extraction plan. Upon receiving confirmation of the extraction plan, the system extracts the identified data objects from the external multi-tenant SaaS environment in accordance with the extraction plan.

15 Claims, 4 Drawing Sheets

(56) References Cited

U.S. PATENT DOCUMENTS

| | | |
|---|---|---|
| 2014/0278534 A1 | 9/2014 | Romeo |
| 2016/0147999 A1 | 5/2016 | Fontanetta et al. |
| 2016/0308855 A1 | 10/2016 | Lacey et al. |
| 2017/0025040 A1 | 1/2017 | Maturana et al. |
| 2017/0048252 A1 | 2/2017 | Straub et al. |
| 2017/0091293 A1 | 3/2017 | Cummings et al. |
| 2017/0249656 A1* | 8/2017 | Gantner ................. G06Q 50/01 |
| 2018/0081905 A1 | 3/2018 | Kamath et al. |
| 2018/0089270 A1 | 3/2018 | Qiu et al. |
| 2018/0176117 A1 | 6/2018 | Gudetee et al. |
| 2019/0007206 A1 | 1/2019 | Surla et al. |
| 2019/0042988 A1* | 2/2019 | Brown ................. G06F 16/9535 |
| 2020/0067772 A1 | 2/2020 | Tomkins et al. |
| 2020/0082890 A1 | 3/2020 | Karr et al. |
| 2020/0127937 A1 | 4/2020 | Busick et al. |
| 2021/0049029 A1 | 2/2021 | Kumble et al. |
| 2021/0067324 A1 | 3/2021 | Valente et al. |
| 2022/0067115 A1* | 3/2022 | Zheng ....................... G06N 5/04 |
| 2022/0107826 A1 | 4/2022 | Bin et al. |
| 2022/0129804 A1* | 4/2022 | Dooley .............. G06Q 10/0635 |
| 2022/0188334 A1 | 6/2022 | Chen |
| 2022/0207489 A1* | 6/2022 | Gupta ....................... H04N 7/15 |
| 2023/0010219 A1 | 1/2023 | Howley et al. |
| 2023/0082010 A1 | 3/2023 | Clifford et al. |
| 2023/0145349 A1 | 5/2023 | Watari |

\* cited by examiner

SYSTEM, METHOD, AND COMPUTER PROGRAM FOR EXTRACTING LARGE CUSTOMER DATA VOLUMES AT HIGH SPEED FROM AN EXTERNAL MULTI-TENANT SAAS ENVIRONMENT

BACKGROUND OF THE INVENTION

1. Field of the Invention

This invention relates generally to a multi-tenant SaaS environment and, more specifically, to a system and method for extracting large customer data volumes at high speed from an external multi-tenant SaaS environment.

2. Description of the Background Art

The present invention relates to extracting customer data from an external multi-tenant SaaS environment. The data may be extracted for backup or providing availability outside the SaaS environment (e.g., an ultra-high availability cloud emulator). Examples of SaaS providers include SALESFORCE, ORACLE, and MICROSOFT. SaaS customers do not own or control the infrastructure on which the software is run and on which their data is stored. They just have access to the service.

The problem is that there is a large amount of data that has to go through the SaaS provider's APIs, where the APIs can be likened to a narrow "tube" for the data. In addition, the SaaS provider has limits on API use. For example, the limits may be based on the type of package the customer has purchased from the SaaS provider. The customer also needs to use its allocated API bandwidth for accessing the SaaS software application (i.e., reading from and writing to the SaaS environment). Therefore, any backup must comply with the SaaS provider's API limits and also not interfere with the customer's ability to use the SaaS application. The backup also has time constraints. For example, if you want to have daily backups, then the backup cannot take more than one day. Also, the more time it takes to backup data, the more inconsistencies there will be between the backup and the customer's actual data. The customer may also be making changes to the data while the backup is taking place.

While the SaaS provider has a number of APIs, there is a need for a system and method for determining which data to extract using which API so that the data can be extracted efficiently without violating the SaaS provider and customer API constraints.

SUMMARY OF THE DISCLOSURE

The present disclosure describes a system, method, and computer program for extracting large customer data volumes at high speed from an external multi-tenant SaaS environment. The method is performed by a computer system that includes servers, storage systems, networks, operating systems, and databases.

The present invention provides a system and method for extracting large customer data volumes at high speed from an external multi-tenant SaaS environment according to an extraction plan that specifies the extraction groups for the data objects as well as the API, extraction frequency, extraction mode, extraction parameters, and degree of parallelism for each extraction group in order to optimize the efficiency of extracting the data objects without violating the SaaS provider and customer API constraints. In certain embodiments, the method includes classifying each data object with a shape, where the shape of the data object is a function of the volume, width, field types, and field weights of the data object, and the API is assigned to each extraction group based at least in part on the shape of the data objects in the extraction group. In certain embodiments, the method further includes identifying chunks of data in a data object for purposes of data extraction, and, after extracting the data object, reconciling the chunks of data in the data object. In certain embodiments, an API is assigned to an extraction group based on a specified API, a preferred API, or a default API. In certain embodiments, an API is assigned to an extraction group using a neural network to predict the preferred API assignment for the extraction group based on one or more characteristics of the data objects in the extraction group and the scope of data extraction for the extraction group.

In one embodiment, a method for extracting large customer data volumes at high speed from an external multi-tenant SaaS environment comprises the following steps:
  identifying a plurality of customer data objects to be extracted from the multi-tenant SaaS environment;
  creating an extraction plan for extracting the identified data objects, wherein creating an extraction plan comprises:
    identifying a plurality of characteristics of each data object to be extracted, wherein the characteristics include a volume, a width, one or more field types, and one or more field weights of the data object;
    creating a plurality of extraction groups, wherein each extraction group includes one or more data objects;
    determining an extraction frequency and an extraction mode for each of the extraction groups;
    determining a scope of data extraction for each of the extraction groups;
    assigning an API to each extraction group based on one or more characteristics of the data objects in the extraction group, the scope of data extraction for the extraction group, and the customer's available bandwidth for each of the APIs to the multi-tenant SaaS environment;
    identifying one or more extraction parameters for each of the extraction groups;
    determining a degree of parallelism among the extraction groups;
    creating an extraction plan that specifies the extraction groups as well as the APIs, extraction frequency, extraction mode, the one or more extraction parameters, and degree of parallelism for each extraction group;
  displaying the extraction plan in a user interface and enabling a user to edit the extraction plan;
  receiving confirmation of the extraction plan from the user; and
  extracting the identified data objects from the external multi-tenant SaaS environment in accordance with the extraction plan.

DETAILED DESCRIPTION OF THE PREFERRED EMBODIMENTS

The present disclosure describes a system, method, and computer program for extracting large customer data volumes at high speed from an external multi-tenant SaaS environment. The method is performed by a computer system that includes servers, storage systems, networks, operating systems, and databases ("the system").

Example implementations of the methods are described in more detail with respect to FIGS. 1-4.

1. METHOD FOR EXTRACTING LARGE CUSTOMER DATA VOLUMES AT HIGH SPEED FROM AN EXTERNAL MULTI-TENANT SAAS ENVIRONMENT

Figure 1:
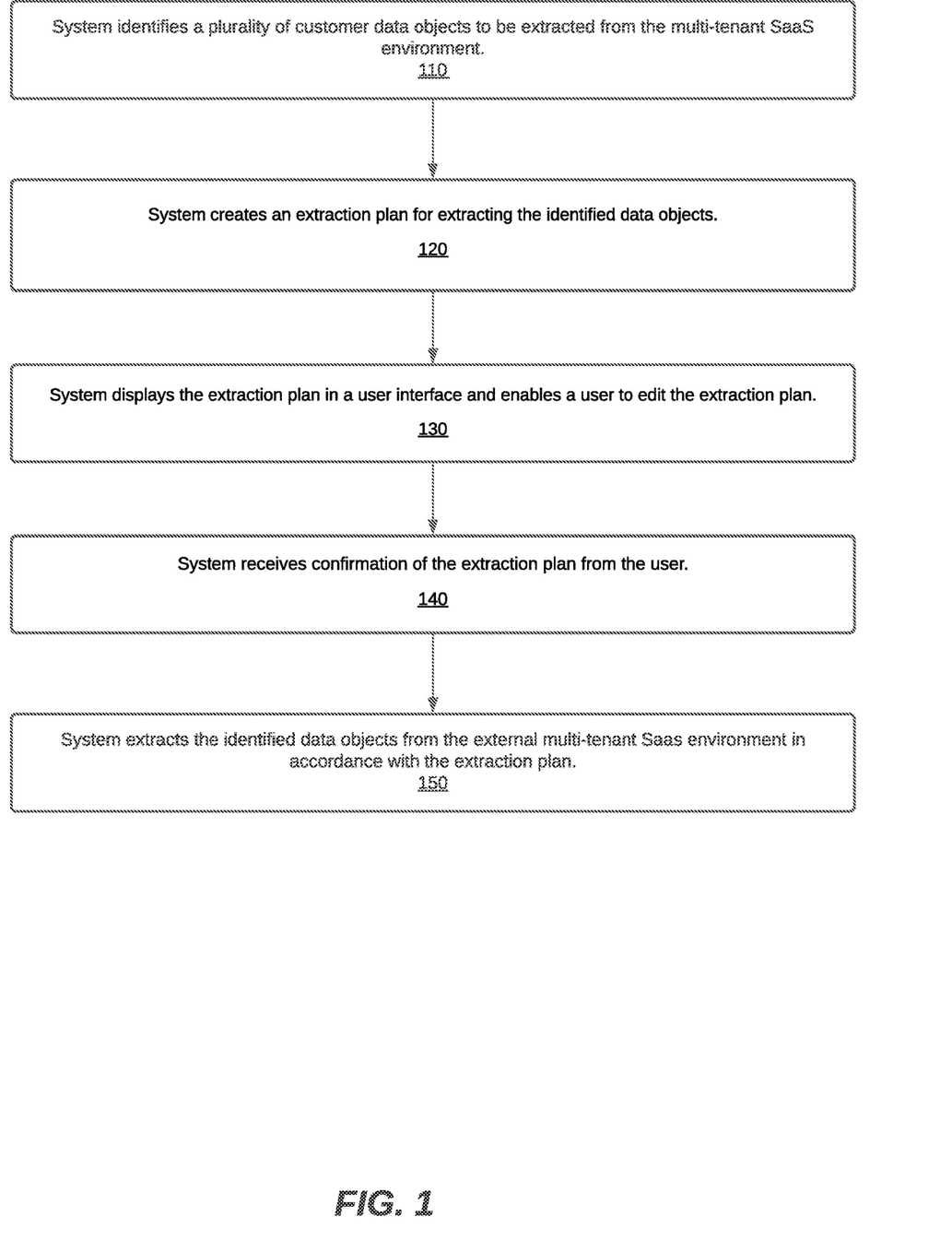
FIG. 1 is a flowchart that illustrates a method, according to one embodiment, for extracting large customer data volumes at high speed from an external multi-tenant SaaS environment.

FIG. 1 illustrates a method for extracting large customer data volumes at high speed from an external multi-tenant SaaS environment. Data may be extracted for backup purposes, for ultra-high availability (UHA), etc. One example of a UHA system that extracts data is described in U.S. Pat. No. 11,055,123, which issued on Jul. 6, 2021 and is incorporated by reference as if fully disclosed herein. The system identifies a plurality of customer data objects to be extracted from the multi-tenant SaaS environment (step 110). This is done by first extracting the customer metadata. The metadata indicates which data objects the customer has in the SaaS environment. The system creates an extraction plan for extracting the identified data objects (step 120). The system displays the extraction plan in a user interface and enables a user to edit the extraction plan (step 130). The system receives confirmation of the extraction plan from the user (step 140). The system extracts the identified data objects from the external multi-tenant SaaS environment in accordance with the extraction plan (step 150).

2. METHOD FOR CREATING AN EXTRACTION PLAN FOR EXTRACTING DATA OBJECTS

Figure 2:
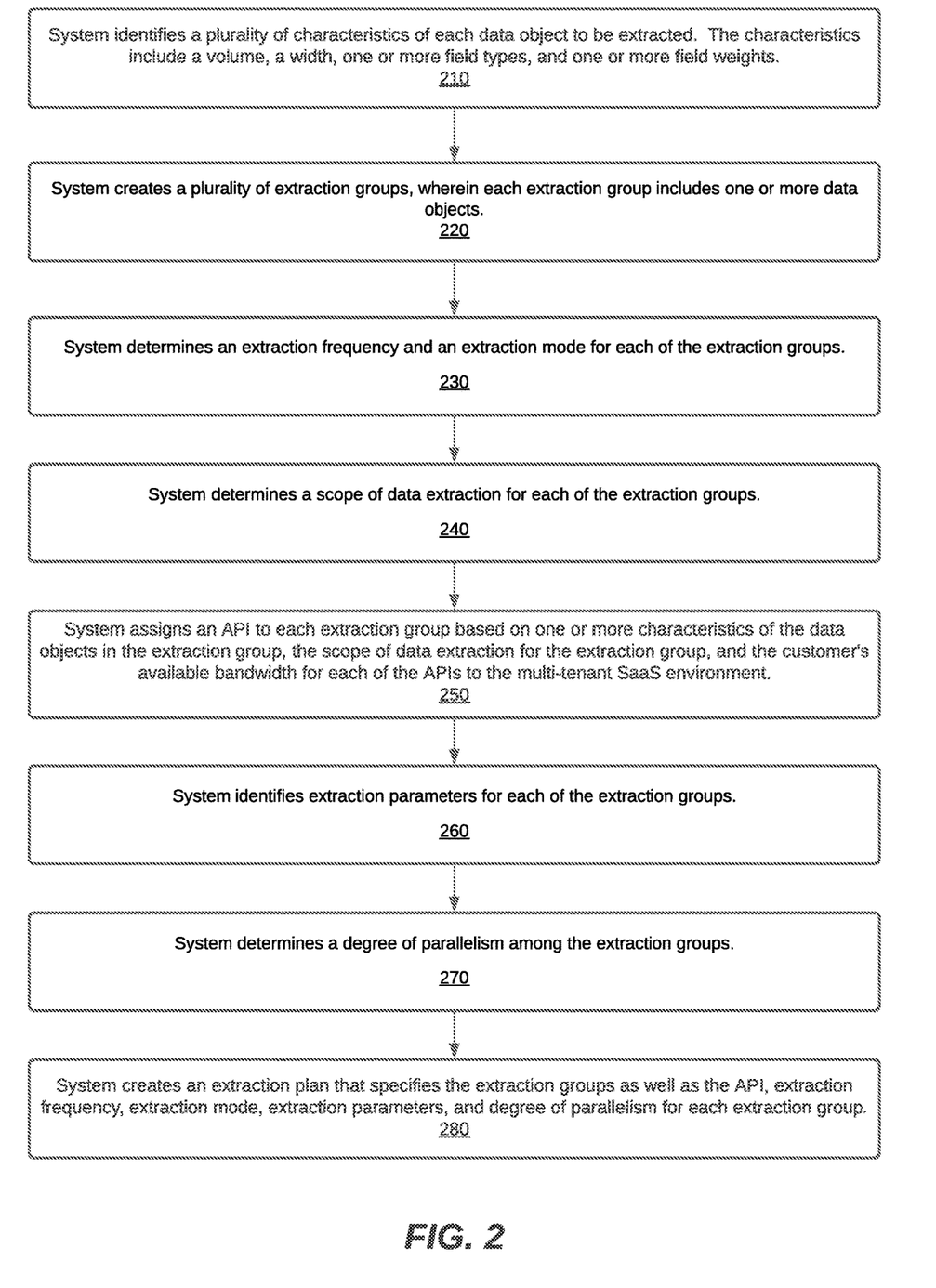
FIG. 2 is a flowchart that illustrates a method, according to one embodiment, for creating an extraction plan for extracting data objects.

FIG. 2 illustrates a method for creating an extraction plan for extracting data objects. The system identifies a plurality of characteristics of each data object to be extracted (step 210). The characteristics can be identified from the metadata. The characteristics include a volume, a width, one or more field types, and one or more field weights. Volume is the number of rows in a data object. Width is the number of fields in the data object. Examples of field types include rich text, integer, file, etc. Weight is the measure of the quantity of data to be extracted in the fields (e.g., 256 characters, one megabyte, etc.).

The system creates a plurality of extraction groups, where each extraction group includes one or more data objects (step 220). The system determines an extraction frequency and an extraction mode for each of the extraction groups (step 230). In one embodiment, the system may determine extraction frequency based on the type of data being extracted. Examples of extraction modes in a backup system are full backup and incremental backups. The system determines a scope of data extraction for each of the extraction groups (step 240). Determining the scope of data extraction may include determining what types of data will be extracted for the data objects in the extraction group. In certain embodiments, determining the scope of data extraction for an extraction group includes determining whether files will be extracted from data objects in the group. For example, this may include determining whether the system will extract all non-file data, extract both data and files, extract files only, include deleted records from the data objects, etc.

The system assigns an API to each extraction group based on one or more characteristics of the data objects in the extraction group, the scope of data extraction for the extraction group, and the customer's available bandwidth for each of the APIs to the multi-tenant SaaS environment (step 250). Examples of APIs include SOAP, REST, Bulk, Bulk+, Bulkv2, etc. In certain embodiments, multiple extraction groups are associated with the same API.

The system identifies extraction parameters for each of the extraction groups (step 260). In certain embodiments, identifying extraction parameters includes identifying chunks of data in a data object for purposes of data extraction, and after the extraction step, the method further includes reconciling the chunks of data in the data object. In one embodiment, this involves determining whether to extract one or more data objects in an extraction group using chunks of data, for example, by determining whether to split or divide data objects by rows. This may be especially useful for "tall" data objects having lots of rows (e.g., greater than 1,000,000). The system then determines a degree of parallelism among the extraction groups (step 270). In addition to parallelism taking place among the extraction groups, it can also take place within an extraction group.

The system creates an extraction plan that specifies the extraction groups as well as the API, extraction frequency, extraction mode, extraction parameters, and degree of parallelism for each extraction group (step 280). In one embodiment, the system defaults to extracting up to a threshold number (e.g., 10) groups in parallel, depending on the amount of API bandwidth the customer has purchased from the SaaS provider and the customer usage of the APIs.

In certain embodiments, the method includes classifying each data object with a shape, where the shape of a data object is a function of the volume, width, field type, and field weights of the data object. In certain embodiments, the API assigned to each extraction group is based at least in part on the shape of the data objects in the extraction group. In certain embodiments, creating the extraction groups includes grouping data objects by shape and creating an extraction group for each shape grouping.

In certain embodiments, the method includes, for each extraction group, determining whether any data fields of data objects in the extraction group should be excluded from the extraction group, and, in response to determining to exclude a data field from an extraction group, excluding the data field. For example, the system may exclude all file fields from the backup group. SaaS providers often mandate that files must be extracted with the slowest available API (e.g., REST). The system may exclude files from a backup group so that a faster API may be used for the other data in the group. It may create a backup group just for files. In certain embodiments, the method further includes excluding a data field from a first extraction group that is also included in a second extraction group. In certain embodiments, the method includes excluding a data field from an extraction group in response to the data field being incompatible with the API assigned to the extraction group.

In certain embodiments, creating the plurality of extraction groups includes grouping data objects by object type and creating an extraction group for each object type. For example, creating an extraction group for each of the following: metadata, standard data objects in the SaaS environment, customer data objects, deleted data, archived data, etc. In certain embodiments, creating the extraction groups further includes creating an extraction group for a specific data type. For example, creating an extraction group for files.

3. METHOD FOR ASSIGNING AN API TO AN EXTRACTION GROUP

Figure 3:
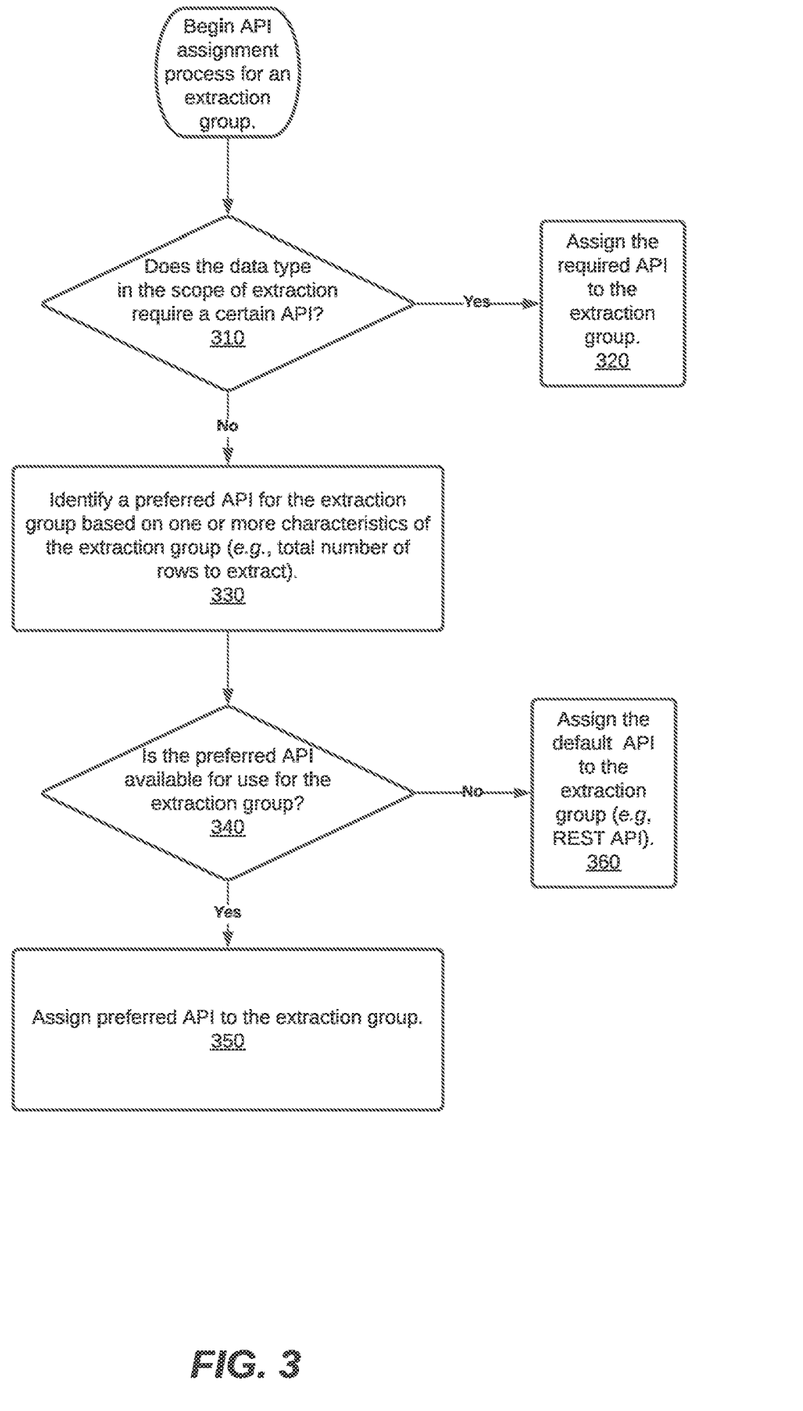
FIG. 3 is a flowchart that illustrates a method, according to one embodiment, for assigning an API to an extraction group.

FIG. 3 illustrates a method for assigning an API to an extraction group. The system begins the API assignment process for an extraction group by determining whether a data type in the scope of extraction requires a certain API (step 310). In response to determining that the data type in the scope of extraction does require a certain API, the system assigns the required API to the extraction group (step 320). An example of this is determining whether the scope of extraction includes files, and, if it does, assigning the extraction group to an API required for files (e.g., the REST API).

In response to determining that the data type in the scope of extraction does not require a certain API, the system identifies a preferred API for the extraction group based on one or more characteristics of the extraction group (step 330). In one embodiment, the preferred API is based on the total number of rows being extracted for the extraction group. For extraction groups with larger amounts of rows, the preferred API is an API that is optimized for large data sets. If the extraction group is relatively small, then the preferred API may be a slower API with less bandwidth constraints. For example, in one embodiment, the preferred APIs are as follows: 1) less than 50,000 rows uses the REST API, which is an API that conforms to the constraints of the REST architectural style and allows for the interaction with RESTful web services, 2) between 50,000-1,000,000 rows uses the Bulk API, which conforms to REST principles, but is optimized for large data sets, and 3) more than 1,000,000 rows uses the Bulk PK Chunking. The system then determines whether the preferred API is available to use for the extraction group (step 340). In one embodiment, this depends on the plan the customer has purchased from the SaaS provider (i.e., the amount of bandwidth available to the customer for a certain API may depend on the plan they purchased) and the customer usage of the preferred API for other purposes. A customer may specify that no more than a certain percentage of bandwidth of the preferred API can be used for data extraction. This is because the customer may be primarily using the API to access the cloud-based software services. In response to determining that the preferred API is available to use for the extraction group, the system assigns the preferred API to the extraction group (step 350). In response to determining that the preferred API is not available to use for the extraction group, the system assigns the default API to the extraction group (step 360). In one embodiment, the default API for all groups is the REST API.

In certain embodiments, assigning an API to an extraction group includes using a neural network to predict a preferred API assignment for the extraction group based on one or more characteristics of the data objects in the extraction group and the scope of data extraction for the extraction group. The neural network may be trained using labeled past extraction results. In certain embodiments, one of the characteristics is the total number of rows to be extracted in the extraction group.

4. EXAMPLE SOFTWARE ARCHITECTURE

Figure 4:
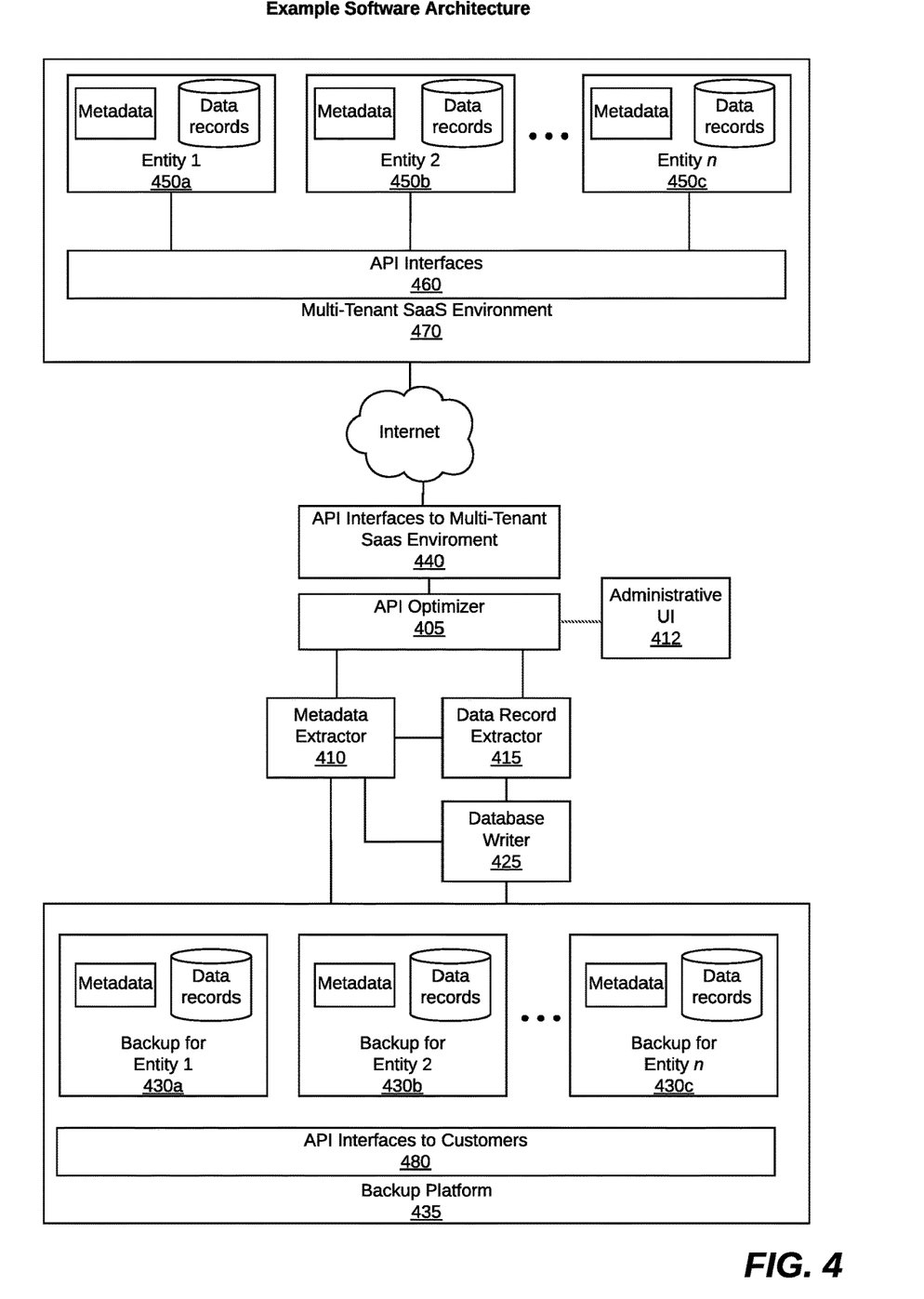
FIG. 4 is a block diagram that illustrates an example software architecture according to one embodiment.

FIG. 4 illustrates an example architecture for a system that performs the methods described herein. However, the methods described herein may be implemented in other systems and are not limited to the illustrated system. In order to obtain metadata and extract data records from a plurality of entities (e.g., Entity 1 to Entity n) in a multi-tenant SaaS environment 470 via the internet, one or more API interfaces 440 interfaces with the API interfaces 460 of the multi-tenant SaaS environment 470, an API optimizer 405 distributes API requests among a plurality of APIs and has a corresponding administrative user interface (UI) 412, a metadata extractor 410 extracts metadata, a data record extractor 415 extracts data records, and a database writer 425 writes to the database of the backup platform 435.

The backup platform 435 hosts a backup for each entity 430a, 430b, 430c. Each backup 430a, 430b, 430c includes the metadata and extracted data records that corresponds to the metadata and data records for each entity in the multi-tenant SaaS environment 450a, 450b, 450c. Both the multi-tenant SaaS environment 470 and the backup platform 435 do not provide a separate database for each entity. Hence, while the data records are illustrated separately using database symbols with respect to each entity in both the multi-tenant SaaS environment 470 and the backup platform 435, the database(s) is(are) often shared between entities on their respective servers. A customer can make API calls to the backup 430a, 430b, 430c via API interface 480.

5. GENERAL

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for extracting large customer data volumes at high speed from an external multi-tenant software-as-a-service (SaaS) environment, the method comprising:
    identifying a plurality of customer data objects to be extracted from the multi-tenant SaaS environment;
    classifying each data object with a shape, wherein the shape of a data object is a function of the volume, width, field type(s), and field weight(s) of the data object;
    creating an extraction plan for extracting the identified data objects, wherein creating an extraction plan comprises:
        identifying a plurality of characteristics of each data object to be extracted, wherein the characteristics include a volume, a width, one or more field types, and one or more field weights of the data object;

creating a plurality of extraction groups, wherein each extraction group includes one or more data objects;

determining an extraction frequency and an extraction mode for each of the extraction groups;

determining a scope of data extraction for each of the extraction groups;

assigning an application programming interface (API) to each extraction group using a neural network to predict a preferred API assignment for the extraction group based on one or more characteristics of the data objects in the extraction group, including the shape of the data objects in the extraction group, and the scope of data extraction for the extraction group, wherein assigning the API to each extraction group also considers the customer's available bandwidth for the API to the multi-tenant SaaS environment;

identifying one or more extraction parameters for each of the extraction groups;

determining a degree of parallelism among the extraction groups;

creating an extraction plan that specifies the extraction groups as well as the APIs, extraction frequency, extraction mode, the one or more extraction parameters, and degree of parallelism for each extraction group;

displaying the extraction plan in a user interface and enabling a user to edit the extraction plan;

receiving confirmation of the extraction plan from the user; and extracting the identified data objects from the external multi-tenant SaaS environment in accordance with the extraction plan.

2. The method of claim 1, wherein creating the extraction groups comprises:
grouping data objects by shape; and
creating an extraction group for each shape grouping.

3. The method of claim 1, further comprising:
for each extraction group, determining whether any data fields of data objects in the extraction group should be excluded from the extraction group; and
in response to determining to exclude a data field from an extraction group, excluding the data field.

4. The method of claim 3, further comprising excluding a data field from a first extraction group that is also included in a second extraction group.

5. The method of claim 3, further comprising excluding a data field from an extraction group in response to the data field being incompatible with the API assigned to the extraction group.

6. The method of claim 1, wherein creating the plurality of extraction groups comprises:
grouping data objects by object type; and
creating an extraction group for each object type.

7. The method of claim 6, wherein creating the extraction groups further comprises:
creating an extraction group for a specific data type.

8. The method of claim 1, wherein, identifying extraction parameters comprises identifying chunks of data in a data object for purposes of data extraction, and, after the extraction step, the method further comprises reconciling the chunks of data in the data object.

9. The method of claim 1, wherein determining the scope of data extraction for an extraction group includes determining whether files will be extracted from the data objects in the group.

10. The method of claim 1, wherein assigning an API to an extraction group comprises:
determining whether a data type in the scope of extraction requires a specified API;
in response to determining a data type in the scope of extraction requires a specified API, assigning the specified API to the extraction group; and
in response to determining that no specified API is required for the scope of extraction, performing the following:
identifying a preferred API for the extraction group based on one or more characteristics of the extraction group;
determining whether the preferred API is available for use in data extraction;
in response to the preferred API being available for use in data extraction, assigning the preferred API to the extraction group; and
in response to the preferred API not being available for use in data extraction, assigning a default API to the extraction group.

11. The method of claim 1, wherein one of the characteristics is the total number of rows to be extracted in the extraction group.

12. A non-transitory computer-readable medium comprising a computer program, that, when executed by a computer system, enables the computer system to perform the following steps for extracting large customer data volumes at high speed from an external multi-tenant software-as-a-service (SaaS) environment, the steps comprising:

identifying a plurality of customer data objects to be extracted from the multi-tenant SaaS environment;

classifying each data object with a shape, wherein the shape of a data object is a function of the volume, width, field type(s), and field weight(s) of the data object;

creating an extraction plan for extracting the identified data objects, wherein creating an extraction plan comprises:
identifying a plurality of characteristics of each data object to be extracted, wherein the characteristics include a volume, a width, one or more field types, and one or more field weights of the data object;
creating a plurality of extraction groups, wherein each extraction group includes one or more data objects;
determining an extraction frequency and an extraction mode for each of the extraction groups;
determining a scope of data extraction for each of the extraction groups;
assigning an application programming interface (API) to each extraction group using a neural network to predict a preferred API assignment for the extraction group based on one or more characteristics of the data objects in the extraction group, including the shape of the data objects in the extraction group, and the scope of data extraction for the extraction group, wherein assigning the API to each extraction group also considers the customer's available bandwidth for the API to the multi-tenant SaaS environment;
identifying one or more extraction parameters for each of the extraction groups;
determining a degree of parallelism among the extraction groups;
creating an extraction plan that specifies the extraction groups as well as the APIs, extraction frequency, extraction mode, the one or more extraction parameters, and degree of parallelism for each extraction group;

displaying the extraction plan in a user interface and enabling a user to edit the extraction plan;

receiving confirmation of the extraction plan from the user; and extracting the identified data objects from the external multi-tenant SaaS environment in accordance with the extraction plan.

13. The non-transitory computer-readable medium of claim 12, wherein assigning an API to an extraction group comprises:

determining whether a data type in the scope of extraction requires a specified API;

in response to determining a data type in the scope of extraction requires a specified API, assigning the specified API to the extraction group; and in response to determining that no specified API is required for the scope of extraction, performing the following:

identifying a preferred API for the extraction group based on one or more characteristics of the extraction group;

determining whether the preferred API is available for use in data extraction;

in response to the preferred API being available for use in data extraction, assigning the preferred API to the extraction group; and in response to the preferred API not being available for use in data extraction, assigning a default API to the extraction group.

14. A computer system for extracting large customer data volumes at high speed from an external multi-tenant software-as-a-service (SaaS) environment, the system comprising:

one or more processors;

one or more memory units coupled to the one or more processors, wherein the one or more memory units store instructions that, when executed by the one or more processors, cause the system to perform the operations of:

identifying a plurality of customer data objects to be extracted from the multi-tenant SaaS environment;

classifying each data object with a shape, wherein the shape of a data object is a function of the volume, width, field type(s), and field weight(s) of the data object;

creating an extraction plan for extracting the identified data objects, wherein creating an extraction plan comprises:

identifying a plurality of characteristics of each data object to be extracted, wherein the characteristics include a volume, a width, one or more field types, and one or more field weights of the data object;

creating a plurality of extraction groups, wherein each extraction group includes one or more data objects;

determining an extraction frequency and an extraction mode for each of the extraction groups;

determining a scope of data extraction for each of the extraction groups;

assigning an application programming interface (API) to each extraction group using a neural network to predict a preferred API assignment for the extraction group based on one or more characteristics of the data objects in the extraction group, including the shape of the data objects in the extraction group, and the scope of data extraction for the extraction group, wherein assigning the API to each extraction group also considers the customer's available bandwidth for the API to the multi-tenant SaaS environment;

identifying one or more extraction parameters for each of the extraction groups;

determining a degree of parallelism among the extraction groups;

creating an extraction plan that specifies the extraction groups as well as the APIs, extraction frequency, extraction mode, the one or more extraction parameters, and degree of parallelism for each extraction group;

displaying the extraction plan in a user interface and enabling a user to edit the extraction plan;

receiving confirmation of the extraction plan from the user; and extracting the identified data objects from the external multi-tenant SaaS environment in accordance with the extraction plan.

15. The computer system of claim 14, wherein assigning an API to an extraction group comprises:

determining whether a data type in the scope of extraction requires a specified API;

in response to determining a data type in the scope of extraction requires a specified API, assigning the specified API to the extraction group; and in response to determining that no specified API is required for the scope of extraction, performing the following:

identifying a preferred API for the extraction group based on one or more characteristics of the extraction group;

determining whether the preferred API is available for use in data extraction;

in response to the preferred API being available for use in data extraction, assigning the preferred API to the extraction group; and in response to the preferred API not being available for use in data extraction, assigning a default API to the extraction group.

* * * * *